Feb. 2, 1943.           F. E. BARTHOLY           2,310,052
                  RADIO DIRECTION FINDING SYSTEM
                       Filed Oct. 16, 1940
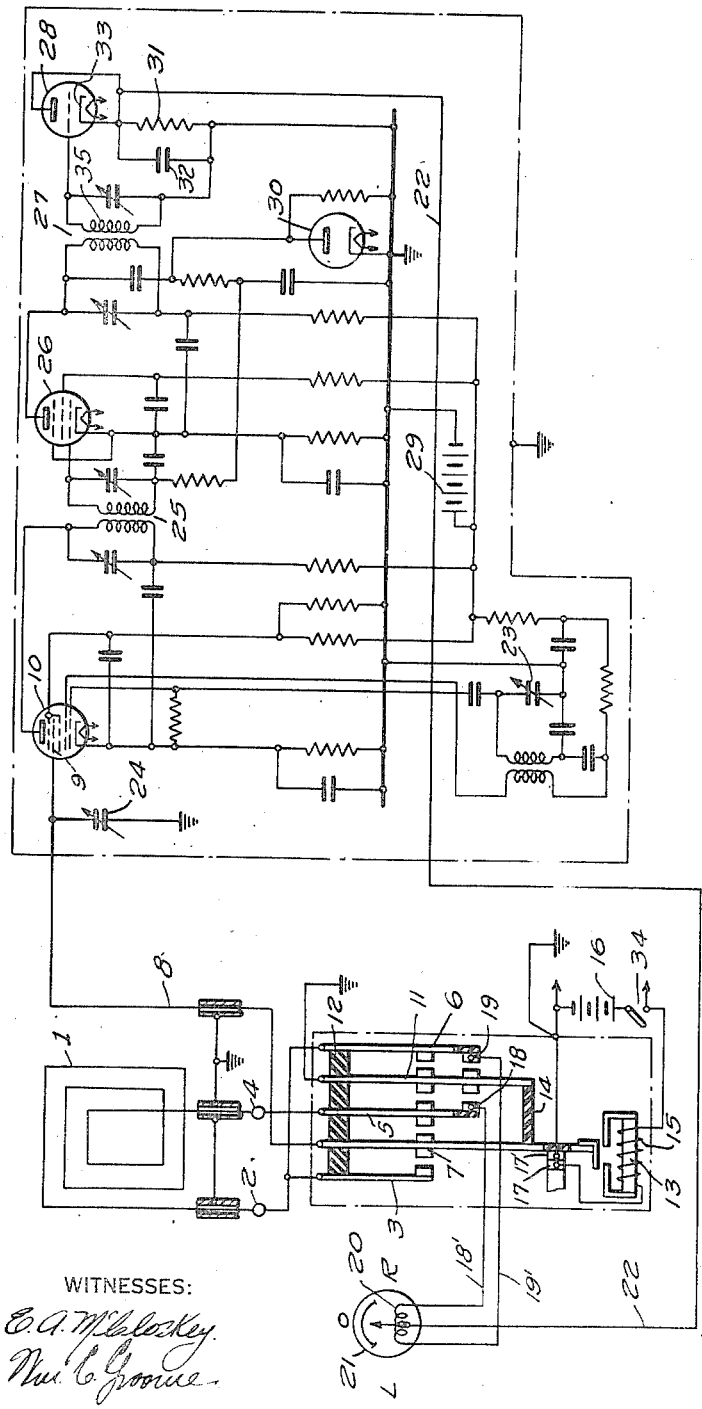
WITNESSES:
E. A. McCloskey
Wm. C. Groome
INVENTOR
Frederick E. Bartholy.
BY
W. Lyle
ATTORNEY Patented Feb. 2, 1943

2,310,052

UNITED STATES PATENT OFFICE 2,310,052

RADIO DIRECTION FINDING SYSTEM

Frederick E. Bartholy, Wilkinsburg, Pa., assignor to Westinghouse Electric & Manufacturing Company, East Pittsburgh, Pa., a corporation of Pennsylvania Application October 16, 1940, Serial No. 361,441

1 Claim. (Cl. 250—11)

This invention relates to radio direction finding systems and, more particularly, to systems operating on the principle of the unsymmetrical single loop antenna connected to a radio receiver.

In the operation of such systems a loop antenna is utilized which is not symmetrical to the ground potential side of the system. A loop so connected acts partly as a vertical antenna in addition to exhibiting inherent loop characteristics. Various systems of the prior art make use of single loop antennae, the connection of which is periodically reversed so that at one instant one terminal of the loop is at radio frequency input potential, and the other at ground potential, whereas in the next instant the connection is reversed and the first mentioned terminal will be at ground potential and the other taken as the signal input terminal. If a zero center indicator is caused to deflect to one direction at one terminal connection of the loop and in the other direction at the reversed terminal connection, a bilateral indication of the direction of the received signal will be available on the meter.

The problem confronting the practical application of the above principle of operation is to correlate the rapid reversals of the loop with the positioning of the indicator and to obtain energizing current or voltage of such character as to produce bilateral movement. In this connection various balanced circuits heretofore used, while performing the alternate function, had the disadvantage of being critical of adjustment and, therefore, unreliable in operation and also complicated, requiring a large number of tubes and components.

A particular feature of this invention is that the system in accordance therewith requires no balanced circuits of any kind for bilateral indication and provides a simple mechanical means commonly used in certain receivers for effecting the terminal switching of the loop circuit.

Prior systems proposed have utilized switching means of the general type employed in connection with this invention, and have been known in the art as vibrators, for switching the loop simultaneously with the indicator. In such systems, however, as, for example, in the circuit disclosed in Patent No. 2,197,734, bilateral indication depends on the charge and discharge of certain circuit elements which, therefore, introduce a static potential difference and a time constant. A condition of balance must exist then between these elements, giving rise to inaccurate indication should there be any physical inequality between components. Moreover, the indication occurs in asynchronism with the instantaneous reversals of the loop in that the movement of the indicator is effected upon the time interval of opening of contacts and not establishing the same.

Other features and advantages will be apparent from the following description of the invention pointed out in particularity by the appended claim and taken in connection with the accompanying drawing, in which:

The single figure shows a schematic diagram of the direction finding system in accordance with this invention utilizing an indicator having a balanced winding.

Referring to the drawing, the direction finding system schematically shown may be subdivided into three main elements. One is the loop antenna serving as the pick-up means for the signals of a distant station; second, the receiver which by way of example is shown here as a battery operated superheterodyne constructed along conventional lines of design. The third element is the switching mechanism controlling the synchronous connection of the loop and the indicator with the receiver.

The invention in its more limited aspects concerns itself with the improvement of providing an arrangement for effecting the switching of the indicator in exact synchronism with the switching of the loop circuit. The improvement consists chiefly in that the indicator may be directly connected to the receiver and that the switching operation in connection therewith involves circuits at ground potential.

The dotted lines enclosing the various components indicate proper shields therefor in accordance with standard practice which are at ground potential of the system.

Referring to the drawing, the loop antenna 1 has its terminal 2 connected to the stationary contact 3 and its terminal 4 to the stationary contact 5 of the vibrator mechanism. Cooperating with the stationary contacts 3 and 5 is the moving contactor 7 which connects through lead 8 to the input of the receiver, that is, the control grid 9 of amplifying tube 10. The vibrator has another moving contactor 11 which is connected to ground and cooperates with stationary contacts 5 and 6. The latter is interconnected with stationary contact 3. The various contacts and contactors are properly insulated by a spacer 12 forming an assembly in which both contactors are simultaneously actuated by the electromagnet 13. The two moving contactors 7 and 11 are mechanically interlinked by means of an insulating spacer 14. The winding 15 of the electromagnet 13 is connected to a source represented by the battery 16 through interrupting contacts 17 and 17', which are carried by the contactor 7 and suitably insulated therefrom.

The vibrator herein shown is very similar in structure to those used in automobile receivers for converting battery power into alternating current and also for rectification. Their use in this connection prove very effective and may be subjected to continuous operation for a considerable length of time, since there is practically no current to be carried by the contacts and, therefore, no arcing present.

The stationary contacts 5 and 6 carry another pair of contacts 18 and 19, respectively, which are insulated. Contacts 18 and 19 connect through leads 18' and 19' to the winding 20 of an indicator 21. The winding 20 is divided by means of a center tap which connects through conductor 22 to the output circuit of the receiver, to be described later.

The indicator is preferably a high-resistance type voltmeter with a zero-center movement having equal distances of deviation from the center. The scale may be divided in degrees of deviation with markings for "left" and "right."

The various components of the receiver as stated before follow a conventional arrangement and may be briefly described as consisting of a first amplifier tube 10 which performs the dual function of amplifying the incoming radio frequency energy and also supplying a locally generated oscillation, the frequency of which may be controlled by the tuning condenser 23, whereas the input circuit of the tube 10 is simultaneously tuned by condenser 24. The difference, or intermediate frequency is further amplified through the transmission circuit comprising the intermediate amplifier stage including intermediate frequency transformer 25 and amplifying vacuum tube 26. The output thereof is applied through another intermediate frequency transformer 27 to the input circuit of the detector tube 28. The operating voltages for the various electrodes of the tubes are shown to be obtained from the battery 29 through suitable resistance networks. The filament circuit of the tubes is merely indicated and may be connected, if desired, to the battery 16 which energizes the vibrator, or a separate source may be used. To prevent overloading of the amplifier and to obtain a certain amount of automatic sensitivity control, an automatic volume control circuit is shown including the diode tube 30 which rectifies the output of the amplifier 26 and applies a negative bias to the grid circuit of the intermediate frequency amplifier.

The detector herein shown comprises the vacuum tube 28 connected as a diode rectifier to the secondary winding 35 of the transformer 27. A load resistance 31 in shunt with capacitor 32 is connected between ground and cathode 33 thereof. The conductor 22 from the center tap of the winding 20 of the indicator 21 connects to the high potential side of the load resistance which is at the cathode 33.

Other types of receivers may equally be employed in connection with the system as long as the circuit provides for the generation of a unidirectional voltage which varies in accordance with the strength of the received carrier frequency.

Describing the operation of the system let it be assumed that the loop 1 is in such direction with respect to a distant transmitter that the signal intensity supplied to the receiver is greater when the loop terminal 2 is connected to the grid 9 of amplifier tube 10 and the terminal 4 grounded, whereas when the reverse connection is effected, that is, when terminal 4 is connected to the grid 9 and terminal 2 grounded the signal strength is less. When the switch 34 is closed, current from the batery 16 will flow through the coil 15 of the electromagnet 13. The energization thereof moves the contactor 7 in the direction which causes opening of the contacts 17 and 17'. The current through the coil 15 is thereby disrupted and the returning contactor 7 closes again contacts 17 and 17' and also the associated contacts carried by the contactors 7 and 11. The process is repeated again and the contactors 7 and 11 will oscillate at a definite frequency between the contacts. At the instant when the contactor 7 is in the position to engage the contact 3, the contactor 11 also engages the contact 5. To trace the circuit let us assume that the motion is here arrested. It is seen then that terminal 2 of the loop 1 is connected through contact 3, contactor 7 and conductor 8 to the input of the receiver, namely, the grid 9 of tube 10. Following terminal 4 of the loop 1, through contactor 5 and contact 11, it is returned to ground. The energy supplied to the receiver follows its normal course and upon amplification is rectified by the detector 28 producing a unidirectional voltage across the load resistance 31 between cathode 33 and ground. This voltage is impressed through the conductor 22 to the center tap of the winding 20, the current flowing in this instant through the right hand side portion thereof to ground through conductor 18', contact 18, and contactor 11. The indicator will be displaced by the magnetizing action of one portion of the winding 20 moving the pointer in one direction, let us say, to the right. Now, at the next instant when the vibrator contacts assume the second position in that the contactor 7 engages the contact 5 and the contactor 11, the contact 6, the loop circuit will be reversed and the terminal 4 will be connected through contact 5 and contactor 7 to the grid 9, whereas the terminal 2 will be returned to ground through contact 6 and contactor 11. The signal supplied to the receiver follows its normal course and results in a voltage across the load resistance 31, which is again applied through conductor 22 to the other portion of the winding 20, the current flowing through conductor 19', contacts 19 and contactor 11 to ground. The current in this portion of the winding has the opposite effect on the indicator tending to move it in the opposite direction than before, that is, to the left. Visualizing this motion in rapid succession, for example, at 100 times per second, or whatever may be the natural frequency of the vibrator, the cumulative indication of the meter will depend upon the relative magnitudes of the two sets of voltages applied to the winding 20. The inertia of the meter movement is such that it cannot follow immediately the rapid succession of changes in the current flowing between one and then the other portion of the winding 20. Consequently, when the voltages are of equal magnitude, the movement of the indicator is equally influenced in both directions, and it shall remain at zero. When the energizing voltage is greater in magnitude at one position of the vibrator, the magnetizing force will be unequal and the indicator will deflect toward the direction corresponding to the portion of the winding having the larger magnetizing force. The switching operation being in synchronism with the reversing of the loop terminals, the direction with respect to a distant station may be coordinated with the indication of the meter. When the loop is in such position that the transmitter causes equal input voltages, the direction of the station will be in line with the horizontal axis of the loop. In that case the indicator maintains its position at zero center.

In accordance with the system herein described, the indicator has a center tapped winding and only the grounding of the free terminals need be effected to obtain bilateral response. This is particularly advantageous from an engineering standpoint in that it eliminates additional moving contacts which are usually necessary when both terminals of an undivided coil are switched in order to obtain bilateral movement of the zero center indicator. Furthermore, the single moving contact of the switch in the system herein shown is at ground potential which simplifies the construction of the vibrator and eliminates the need of terminating a circuit above ground potential at the moving contact of a switch. In this manner capacitive losses which such connections usually entail may be reduced to a minimum.

I claim as my invention:

In a direction finding system, a loop antenna having two terminals, a vibrator comprising a plurality of moving contactors cooperating with stationary contacts, a radio receiver including a radio frequency vacuum tube amplifier, an input circuit between cathode and grid thereof, a connection between said grid and one of said moving contactors, leads interconnecting the terminals of said loop with stationary contacts respectively cooperating with said moving contactor, a signal transmission channel in said receiver including a plurality of amplifying stages, an output circuit energized therefrom including a vacuum tube detector, a high resistance between cathode and ground of said tube, a potential indicating device, a divided energizing coil therefor, a connection between the cathode of said last mentioned tube and the common terminal of said divided coil, the free terminals thereof being connected to a pair of stationary contacts of said vibrator cooperating with a moving contactor at ground potential, a second pair of stationary contacts connected to said loop terminals cooperating with said contactor at ground potential, and electromagnetic means for vibrating said contactors at a predetermined rate.

FREDERICK E. BARTHOLY.